United States Patent
Hämäläinen et al.

(10) Patent No.: US 7,776,135 B2
(45) Date of Patent: Aug. 17, 2010

(54) METHOD FOR THE RECOVERY OF GOLD

(75) Inventors: Matti Hämäläinen, Pori (FI); Olli Hyvärinen, Pori (FI)

(73) Assignee: Outotec Oyj, Espoo (FI)

( * ) Notice: Subject to any disclaimer, the term of this patent is extended or adjusted under 35 U.S.C. 154(b) by 1155 days.

(21) Appl. No.: 10/511,382

(22) PCT Filed: Apr. 7, 2003

(86) PCT No.: PCT/FI03/00259

§ 371 (c)(1),
(2), (4) Date: Oct. 14, 2004

(87) PCT Pub. No.: WO03/091463

PCT Pub. Date: Nov. 6, 2003

(65) Prior Publication Data

US 2005/0160877 A1    Jul. 28, 2005

(30) Foreign Application Priority Data

Apr. 23, 2002 (FI) .................................. 20020780

(51) Int. Cl.
*C22B 11/00* (2006.01)
(52) U.S. Cl. ........................................................ 75/744
(58) Field of Classification Search ................... 75/744
See application file for complete search history.

(56) References Cited

U.S. PATENT DOCUMENTS

| 4,244,735 A | 1/1981 | Reynolds et al. ........... 75/101 R |
| 4,551,213 A | 11/1985 | Wilson ........................ 204/111 |
| 4,668,289 A | 5/1987 | Langer et al. .............. 75/118 R |
| 5,487,819 A * | 1/1996 | Everett ........................ 205/347 |
| 6,929,677 B2 * | 8/2005 | Hamalainen .................. 75/743 |

FOREIGN PATENT DOCUMENTS

WO    WO 9400606    1/1994

* cited by examiner

*Primary Examiner*—Roy King
*Assistant Examiner*—Jie Yang
(74) *Attorney, Agent, or Firm*—Buchanan Ingersoll & Rooney PC

(57) ABSTRACT

The invention relates to a method for the recovery of gold in connection with the hydrometallurgical production of copper from a residue or intermediate product containing sulphur and iron generated in the leaching of copper raw material. The recovery of both copper and gold takes place in a chloride milieu. The gold contained in the residue or intermediate product is leached using bivalent copper and oxygen in copper (II) chloride-sodium chloride solution in the conditions, where the oxidation-reduction potential is a maximum of 650 mV and the pH at least 1. The iron and sulphur contained in the residue remain for the most part undissolved.

11 Claims, 1 Drawing Sheet

METHOD FOR THE RECOVERY OF GOLD

Figure 1:
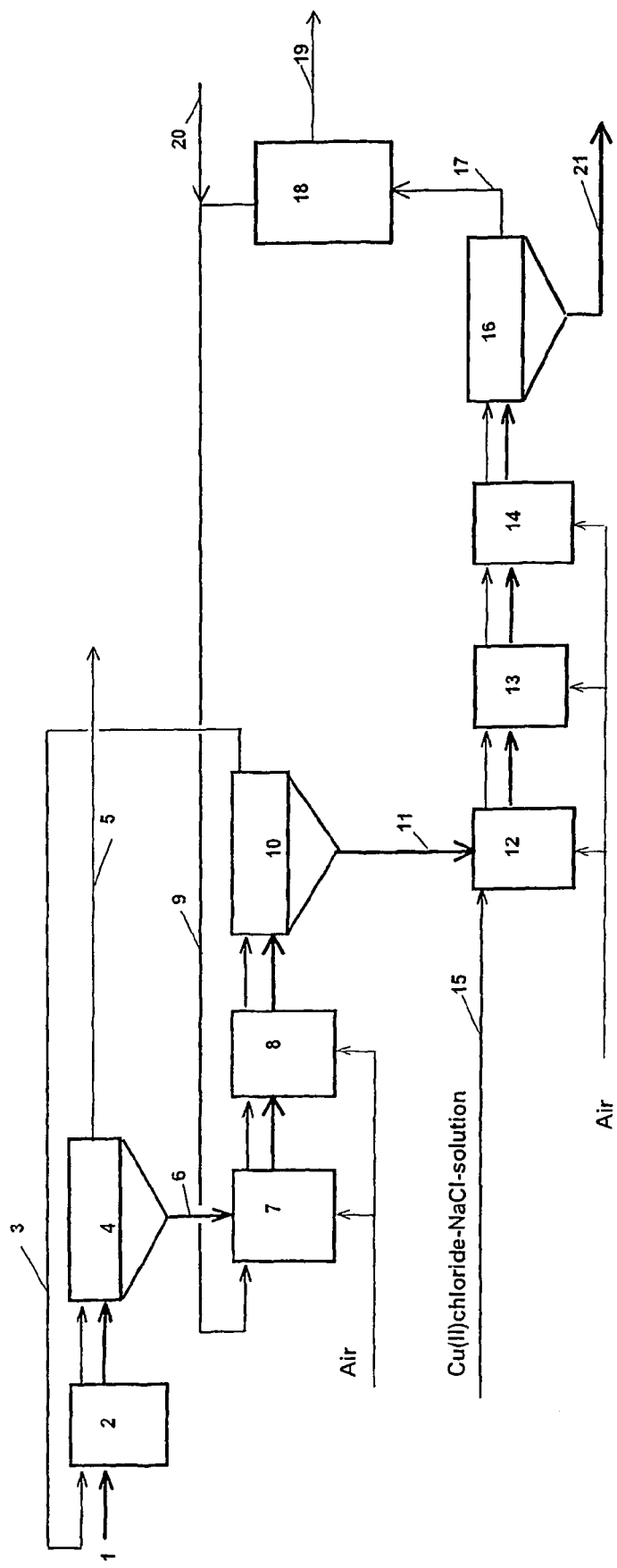

The invention relates to a method for the recovery of gold in connection with the hydrometallurgical production of copper from a residue or intermediate product containing sulphur and iron generated in the leaching of a copper raw material. The recovery of both copper and gold takes place in a chloride milieu. The gold contained in the residue or intermediate product is leached using bivalent copper and oxygen in a copper (II) chloride-sodium chloride solution in an environment, where the oxidation-reduction potential is a maximum of 650 mV and the pH at least 1. The iron and sulphur contained in the residue remain for the most part undissolved.

Some methods are known in the prior art, which are used for leaching gold from sulphur- and iron-containing material in connection with a chloride-based copper recovery process.

U.S. Pat. No. 4,551,213 describes a method whereby gold can be leached from sulphur-containing materials, particularly from the residue of hydrometallurgical processes. A beneficial source material for the method is residue from the CLEAR process. The CLEAR process is a hydrometallurgical copper recovery process, which takes place in a chloride milieu and at raised pressure. Gold-containing residue is slurried in water and the chloride content of the suspension obtained is adjusted so that it contains 12-38 weight percent of chloride. The oxygen reduction potential is regulated within the range of 650-750 mV and the pH below 0. Copper (II) chloride or ferric chloride is added to the suspension to oxidise the gold contained in the raw material so that the gold dissolves. The publication mentions that the oxidation-reduction potential must not rise above 750 mV, because sulphur will dissolve above this value. There is no information on the amount of dissolved sulphur or iron in the publication.

EP patent 646185 relates to copper recovery from sulphidic concentrates using chloride leaching in atmospheric conditions. Gold is leached from the leaching residue into an electrolyte that contains at least two halides, such as sodium chloride and sodium bromide. The purpose is to store oxidising power for the bromine complex on the copper electrolysis anode, and use it to leach the gold in the residue.

There are some drawbacks in the methods mentioned above. The leaching conditions in the method of U.S. Pat. No. 4,551,213 are very harsh. The patent mentions that sulphur still will not dissolve under the conditions of the patent, but this is not universally applicable since the dissolving tendencies of elemental sulphur and the iron compounds mentioned in the patent depend on the generating method of the sulphur and said compounds. Tests we have carried out have shown that when leaching residues formed in atmospheric conditions are treated under the conditions in the above-mentioned patent, there is considerable dissolution of sulphur and iron. Obviously their dissolving affects the economy of the process. The gold leaching method used in EP patent 646185 using a bromine complex on the other hand is not advantageous from an environmental viewpoint, since harmful bromine emissions may be generated in the concentrate leaching stages.

Now a new method has been developed for the leaching of gold from a leaching residue or intermediate product containing iron and sulphur, which have been generated in the atmospheric chloride leaching of copper sulphide concentrate. We have found that it is possible to leach gold from an iron- and sulphur-containing material into an aqueous solution of copper (II) chloride-sodium chloride when oxygen-containing gas is fed into the solution. Leaching takes place thus by means of bivalent copper and oxygen in conditions where the oxidation reduction potential is below 650 mV and the pH of the solution is in the range of 1-3. The operating range according to this method is clearly more beneficial than that mentioned in the prior art, because iron will not yet dissolve in these conditions and sulphur remains for the most part undissolved. This avoids the costs that arise from removing iron and sulphur from the solution. Leaching occurs in atmospheric conditions at a temperature in the range between room temperature and the boiling point of the suspension, preferably however between 80° C. and the boiling point of the suspension. Recovery of gold from the solution is made using some method of the prior art such as electrolysis or with active carbon. The remaining sediment is disposable waste.

The essential features of the invention will be made apparent in the attached claims.

A residue or intermediate product containing gold is pulped into a sodium chloride solution containing copper (II) chloride to form a suspension and the oxidation reduction potential required for gold leaching is obtained using specifically bivalent copper and oxygen. The oxidation-reduction potential is measured with Pt and Ag/AgCl electrodes and the potential is held at a value below 650 mV, preferably a maximum of 620 mV. When the oxidation-reduction potential is held below a value of 650 mV, sulphur will not dissolve from the residue. The preferred pH range is 1.5-2.5. Below a pH value of 1 the iron in the solids will start to dissolve, and this is undesirable. Air, oxygen-enriched air or oxygen can be used as the oxidising gas. The amount of bivalent copper, $Cu^{2+}$, in the solution is preferably 40-80 g/l and the amount of sodium chloride in the range of 200-330 g/l.

It is beneficial to link the method as a sub-process of a copper concentrate chloride leaching process. A method of this type is described in U.S. Pat. No. 6,007,600. In the said method, a copper sulphide-containing raw material such as a concentrate is leached counter-currently with a sodium chloride-copper (II) chloride solution, $NaCl—CuCl_2$, in several stages in order to form a monovalent copper (I) chloride solution, CuCl. A residue remains in leaching, which contains mainly the sulphur and iron of the raw material as well as the gold contained in the raw material. The method now developed relates to the leaching of gold from the residue formed in the type of processes described above.

The method of the present invention is further described in the flowchart of FIG. 1, where gold recovery is connected to the hydrometallurgical recovery of copper. The flowchart represents one example of an embodiment of our invention. The thicker arrows in FIG. 1 show the movement of the solids and the thinner arrows show the flow of the solution.

A sulphidic raw material of copper such as copper sulphide concentrate 1 is fed into the leaching reactor 2 of the first leaching stage, into which is also recirculated solution 3 from a later process stage, which is an aqueous solution of copper (II) chloride-sodium chloride. The thicker arrows indicate the flow of the solids and the thinner arrows the flow of the solution. The copper from the copper concentrate dissolves into the process solution, and the solution is routed to thickening 4. After thickening the overflow 5 contains copper chloride, having about 70 g/l copper mainly as monovalent form, and it is routed to the copper recovery process (not shown in detail). The leaching of the solids contained in underflow 6 is continued further in reactors 7 and 8 of the second leaching stage with solution 9, which is obtained from a later process stage. The $Cu^{2+}$ content of the solution 9 going to the second leaching stage is adjusted to its optimum with an NaCl solution. Air is introduced to the reactors of this stage in order to intensify leaching. Thickening 10 is at the end of the stage.

The overflow 3 from thickening 10 of the second stage is routed to the first stage to leach the concentrate. The leaching of the solids of the underflow 11 is continued in the third stage in reactors 12, 13 and 14 in order to leach the rest of the copper and the gold. Please note that the number of reactors in the flow sheet does not limit the number of reactors in the method of the present invention. In the third leaching stage i.e. the gold leaching stage, the residue is leached with a strong solution of copper (II) chloride-sodium chloride 15, where the $Cu^{2+}$ content is 60-100 g/l and the sodium chloride content 200-330 g/l. Oxygen is fed into the reactors preferably in the form of air. As the leaching stage ends the slurry is routed to thickening 16. The overflow 17 from thickening is routed either as it is or filtered to gold recovery, which in this embodiment takes place in carbon columns 18 using active carbon. The gold product 19 is obtained from the columns. The solution removed from the columns is a gold-free solution 9, which is recirculated to the second stage of the leaching and if required sodium chloride solution 20 is fed into it in order to get a suitable copper (II) chloride content for leaching. The underflow or residue from the gold recovery stage thickening, after normal post treatment such as filtration and washing (not shown in detail) becomes the final waste 21, which contains almost all the sulphur and iron of the concentrate. The residue filtrate and rinse waters are returned for instance to the concentrate leaching process.

The multi-stage leaching of the copper raw material is shown in the flow sheet as counter-current leaching and within the stage the solid matter and solution move basically uniformly from one reactor to another. In order to intensify leaching however, the solids could be recirculated by returning them within the process. Thus the solids may be returned within one of the stages comprising several reactors, from the tail end reactors to the front end reactor of the stage, or recirculation could even be implemented within an individual reactor. At the end of every stage or after each reactor the separation of liquid and solids takes place, generally using a thickener. The solution obtained from the separation between stages, that is the overflow, is routed to the previous stage in the direction of the solids flow and the solid residue, or underflow, is mainly routed to the following leaching stage. Thus part of the underflow of one or each stage can be returned to a reactor from either the previous or the same leaching stage, preferably to the first reactor.

The flow sheet in FIG. 1 presents a gold leaching method in connection with leaching of a copper-containing raw material, but the method of the present invention is not bound exactly to the copper-containing raw material leaching process in the flow sheet. The key point in our method is that the leaching of gold-containing material is performed with bivalent copper and oxidizing gas in conditions where the potential of the solution is less than 650 mV, preferably between 530-620 mV and the pH is at least value of 1, preferably at least a value of between 1.5-2.5. When the oxidizing gas is air, the reactor structures can be formed simply.

The invention is further illustrated in the following example.

EXAMPLE 1

Conditions according to the prior art (U.S. Pat. No. 4,551,213) for the recovery of gold were used in the example. The leaching residue used in the tests originated from chloride-based leaching of a copper sulphide concentrate, performed in atmospheric conditions. The moisture of the residue was 31% by weight and included 3.7% Cu, 28.9% Fe, 32.4% S and 5.8 ppm Au measured as dry weight.

220 g of moist leach residue was placed in a mixing reactor with 500 ml of a solution that contained 40 g/l of $Cu^{2+}$ as chloride and about 300 g/l of NaCl. The solution temperature was 40° C. and the leaching time 12 hours. During the leaching time the oxidation-reduction potential of the slurry in the reactor was kept at a standard value of 680 mV using chlorine gas, when measured with Pt and Ag/AgCl electrodes. The pH of the slurry was allowed to change freely during the test from the original value of 2 to its final value of 0.1. At the end of the test the analyses of the solution and solids were as follows:

| Solution | | |
|---|---|---|
| Fe g/l | S g/l | Au mg/l |
| 42.6 | 9.33 | 1.28 |
| Solids | | |
| Fe % | S % | Au ppm |
| 19.7 | 46.4 | 3.1 |

The test results show that about half of the iron dissolved, which would cause very great removal costs in a production plant. Only about half of the gold dissolved.

EXAMPLE 2

This example was carried out according to the method of the invention. A copper sulphide concentrate ($CuFeS_2$) was leached with a $CuCl_2$—NaCl solution and air in a mixing reactor so that a leaching residue was generated with the following contents (measured as dry weight):

| Cu % | Fe % | S % | Au ppm |
|---|---|---|---|
| 0.7 | 41.6 | 28.6 | 3.9 |

The original concentrate contained about 6.8 ppm of gold, and thus part of it had already dissolved when the concentrate was leached. After this slurry was made from the residue and a new solution, which contained 87 g/l of leaching residue and the original solution, which contained:

| Cu g/l | Fe g/l | S g/l | Au mg/l |
|---|---|---|---|
| 71.2 | 0.08 | 0.553 | 0.016 |

The copper of the original solution was in cupric form. The slurry was held in a mixing reactor equipped with a 5-liter air feed for 12 hours at a temperature of 100° C. The leaching process is illustrated by the following measurements and analysis results, shown in Table 1.

TABLE 1

| Time (h) | pH (reactor) | Potential (mV) | Solution | | | Residue |
| | | | Au mg/l | Fe g/l | S g/l | Au Ppm |
|---|---|---|---|---|---|---|
| 0 | 2.4 | 552 | 0.016 | 0.008 | 0.53 | 3.9 |
| 4 | 2.7 | 572 | 0.136 | 0.002 | 0.86 | |

TABLE 1-continued

| Time (h) | pH (reactor) | Potential (mV) | Solution Au mg/l | Fe g/l | S g/l | Residue Au Ppm |
|---|---|---|---|---|---|---|
| 8 | 2.6 | 610 | 0.240 | 0.003 | 1.09 | |
| 12 | 2.6 | 608 | 0.260 | 0.005 | 1.21 | 0.8 |

Potential: Pt vs. Ag/AgCl 400 ml of the final test filtrate was taken and 10 g of active carbon with an average grain size of 1.5 mm. was added, and it was then mixed for 4 hours at a temperature of 25° C. At the end of mixing the solution was analysed and shown to contain <0.005 mg/l Au.

The analysis results show that the iron remained in insoluble form and that the sulphur also only dissolved a little i.e. about 0.7 g/l. Even though the original gold content was low, the leaching yield was nevertheless a good one, at about 80%.

The invention claimed is:

1. A method for the recovery of gold from a leaching residue or intermediate product containing iron and sulphur, which is generated in the chloride leaching of a copper sulphide raw material at atmospheric pressure, comprising leaching the gold from the residue or intermediate product in an aqueous solution consisting essentially of copper (II) chloride, sodium chloride and oxygen-containing gas; keeping the oxidation-reduction potential of the suspension formed at a value below 650 mV and the pH at a value of 1-3, whereby the iron and sulphur remain mainly undissolved; recovering the dissolved gold, and; discarding the undissolved residue as waste.

2. The method according to claim 1, wherein the oxidation-reduction potential is kept in the range of 530-620 mV.

3. The method according to claim 1, wherein the pH of the suspension is kept at a value of 1.5-2.5.

4. The method according to claim 1, wherein the amount of bivalent copper in the suspension is 40-100 g/L.

5. The method according to claim 1, wherein the amount of sodium chloride in the suspension is 200-330 g/L.

6. The method according to claim 1, wherein the temperature of the suspension is kept in the range between 80° C. and the boiling point of the suspension.

7. The method according to claim 1, wherein the oxygen-containing gas is air.

8. The method according to claim 1, wherein the oxygen-containing gas is oxygen-enriched air.

9. The method according to claim 1, wherein the oxygen-containing gas is oxygen.

10. The method according to claim 1, wherein the dissolved gold is recovered using active carbon.

11. The method according to claim 1, wherein the dissolved gold is recovered by electrolysis.

* * * * *